United States Patent
Duzly et al.

(10) Patent No.: US 8,301,824 B2
(45) Date of Patent: *Oct. 30, 2012

(54) USING AN ADD-ON STORAGE DEVICE FOR EXTENDING THE STORAGE CAPACITY OF A STORAGE DEVICE

(75) Inventors: Yacov Duzly, Ra'anana (IL); Nir Perry, Holon (IL); Yaniv Iarovici, Kfar Saba (IL); Eitan Mardiks, Ra'anana (IL)

(73) Assignee: SanDisk IL Ltd., Kfar Saba (IL)

( * ) Notice: Subject to any disclaimer, the term of this patent is extended or adjusted under 35 U.S.C. 154(b) by 137 days.

This patent is subject to a terminal disclaimer.

(21) Appl. No.: 12/841,957

(22) Filed: Jul. 22, 2010

(65) Prior Publication Data

US 2012/0023297 A1    Jan. 26, 2012

(51) Int. Cl.
*G06F 12/06* (2006.01)
(52) U.S. Cl. .............. 711/2; 711/103; 711/154
(58) Field of Classification Search .................. 711/2
See application file for complete search history.

(56) References Cited

U.S. PATENT DOCUMENTS

| 7,102,671 | B1 | 9/2006 | Asnaashari | |
|---|---|---|---|---|
| 2003/0208501 | A1 | 11/2003 | Walter | |
| 2004/0034738 | A1* | 2/2004 | Huang | 711/115 |
| 2005/0086413 | A1* | 4/2005 | Lee et al. | 710/313 |
| 2007/0288717 | A1* | 12/2007 | Camiel | 711/170 |
| 2009/0164746 | A1 | 6/2009 | Mardiks | |
| 2010/0205350 | A1* | 8/2010 | Bryant-Rich | 711/103 |
| 2011/0029721 | A1* | 2/2011 | Yu et al. | 711/103 |

FOREIGN PATENT DOCUMENTS

EP    0917064 B1    5/1999

OTHER PUBLICATIONS

Response to Office Action dated Jun. 27, 2012, U.S. Appl. No. 12/872,687.
Office Action dated Mar. 27, 2012, U.S. Appl. No. 12/872,687.
Notice of Allowance dated Aug. 20, 2012, U.S. Appl. No. 12/872,687.

* cited by examiner

*Primary Examiner* — Kaushikkumar Patel
(74) *Attorney, Agent, or Firm* — Vierra Magen Marcus & DeNiro LLP

(57) ABSTRACT

A storage device with a memory, a controller, a storage device interface and a host interface, and a method of data transfer to and from a storage device are provided. The storage device is operative to connect with a host device and the storage device interface is operative to couple with an add-on memory. When the host interface is connected to a host device, the controller is configured to receive a data transfer command specifying a memory address from the host interface; and if the memory address is beyond the address space of the memory, to route the data transfer command to the storage device interface for access to the add-on memory. The address space of the memory and an address space of the add-on memory are addressed as one integral address space transparently to the host.

25 Claims, 7 Drawing Sheets

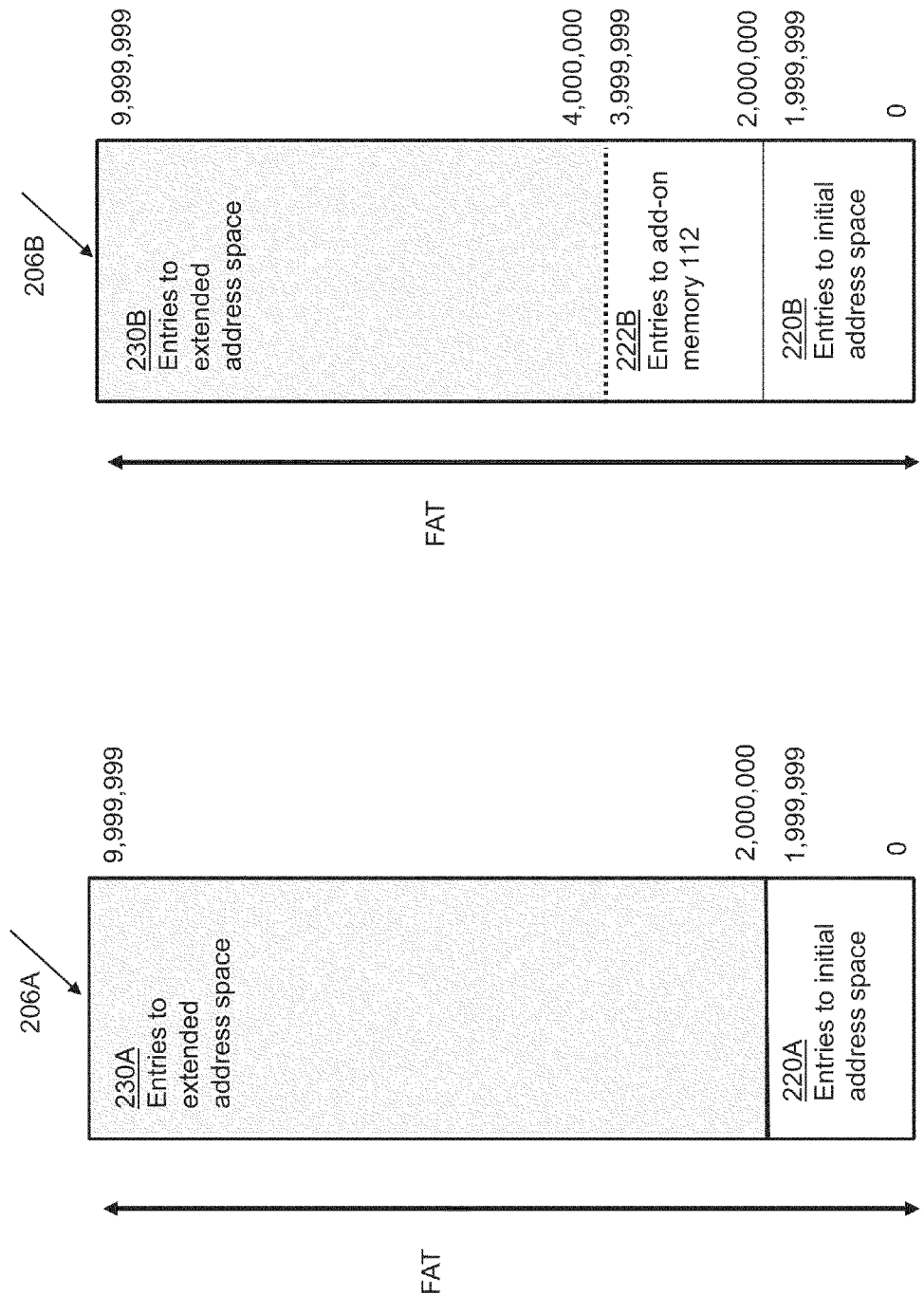

USING AN ADD-ON STORAGE DEVICE FOR EXTENDING THE STORAGE CAPACITY OF A STORAGE DEVICE

BACKGROUND

When a user wishes to download content, like music, pictures, video, etc., or to install more and more applications on a storage device, there may be a need for larger storage space. However, whether it is a removable card or a personal computer, at some point there may not be enough storage capacity to enable these downloads.

In some computing systems there are ways to satisfy the needs of a user for enhanced storage capacity. This is typically done by replacing the currently available storage medium with another storage system having a larger storage means. However, such replacement requires a re-installation of the operating system and of embedded applications. When storage content is scattered in many locations, preserving this content is a challenging operation. Furthermore, there are cases where the storage medium cannot be replaced, for example in the case of embedded storage in a hand-held portable device.

Hence there is a need to provide an easier and more flexible way to extend the storage capacity.

SUMMARY

Embodiments of the present invention are defined by the claims, and this section should not be taken as a limitation on those claims. As a brief introduction, embodiments described in this document and illustrated in the attached drawings generally relate to a storage device, to a method of data transfer to and from a storage device, and to a method of configuring a memory in a storage device. Various embodiments described herein enable using an add-on storage device for extending the storage capacity of a storage device in a host device. This enables data transfer in and out of the storage device beyond the address space of the storage device and in a way that is transparent to the host device, thereby extending the storage capacity of the storage device in a way that is transparent to the host device. The memory may be an embedded memory device installed in a host device and the add-on memory may be a removable storage device capable of being removably connected to the host device.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 3A is a schematic illustration of a file allocation table according to an example embodiment;

FIG. 3B is a schematic illustration showing the file allocation table after an add-on memory is coupled to the storage device;

FIG. 4A is a schematic illustration showing a memory installation according to an example embodiment;

FIG. 4B is a schematic illustration showing the memory installation after an add-on memory is coupled to the storage device;

DETAILED DESCRIPTION

Figure 1:
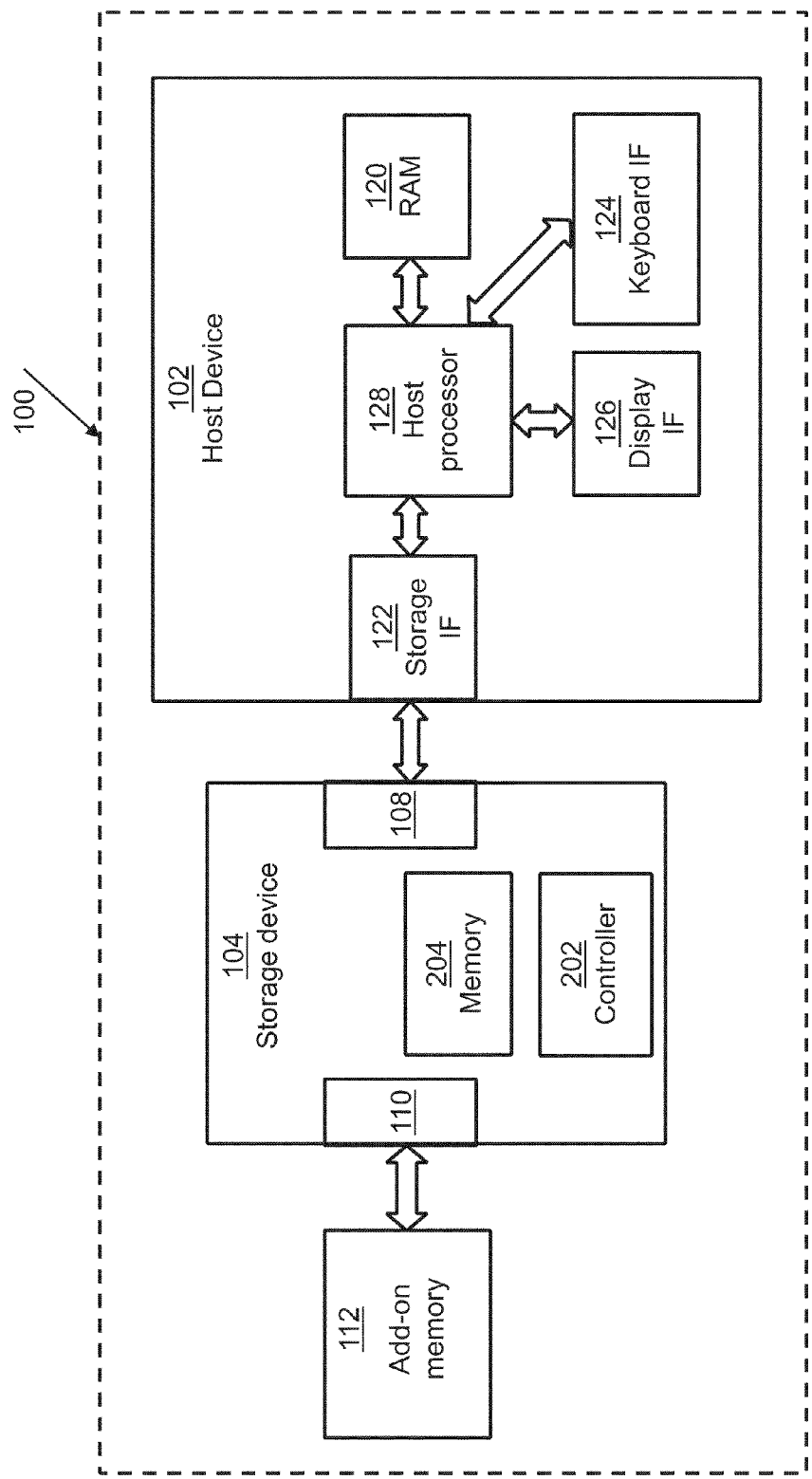
FIG. 1 illustrates one system for storage capacity extension.

The following description is provided in the context of this Application for Letters Patent and its requirements to enable a person of ordinary skill in the art to make and use the claimed invention. Various modifications to and equivalents of the embodiments described and shown are possible and various generic principles defined herein may be applied to these and other embodiments. Thus, the claimed invention is to be accorded the widest scope consistent with the principles, features and teachings disclosed herein.

The approach described here is based, in part, on the observation that to accommodate content downloads to a storage device when coupled to a host device there is a need to extend the storage capacity beyond the address space of the memory in the storage device, in a way that is transparent to the host device.

Extending the storage capacity of the memory beyond its initial address space can be achieved using add-on memory of a removable storage device coupled to the host device and configuring the combined address spaces to work as one storage space transparently to the host device. This approach enables data transfer in and out of the storage device, installation of content, and so on without erasing existing content previously stored in the memory, and without re-formatting the memory in any way (avoiding the need to recreate the FAT).

The storage device of this disclosure is configured with means (e.g. host interface) for coupling with a host device and means (e.g. storage device interface) typically for coupling with an add-on memory of a removable storage device. The storage device may be a removable storage device removably connected to a host device, or an embedded device installed in a host device, and may conform to a memory card (e.g. a Secure Digital SD® card or a micro-SD® card (trademarks of SD-3C LLC, Wilmington, Del.)), a Universal Serial Bus (USB) flash drive, a solid-state device or mechanical hard drive, or another non-volatile storage device having means for coupling with a host and means for coupling with an add-on storage device. The storage device may have a configuration that complies with any memory (e.g. flash memory), Trusted Flash device, Secure Digital ("SD"), mini SD, micro SD, Hard Drive ("HD"), Memory Stick ("MS"), USB device, Disk-on-Key ("DoK"), and the like, and with any memory card format, such as a secured digital (SD) memory card format used for storing digital media such as audio, video, or picture files. The storage device may also have a configuration that complies with a multi media card (MMC) memory card format, a compact flash (CF) memory card format, a flash PC (e.g., ATA Flash) memory card format, a smart-media memory card format, a USB flash drive, or with any other industry standard specifications. One supplier of these memory cards is SanDisk Corporation.

The storage device may also have a configuration complying with a high capacity subscriber identity module (SIM) (HCS) memory card format. The high capacity SIM (HCS) memory card format is a secure, cost-effective and high-capacity storage solution for the increased requirements of multimedia handset, typically configured to use a host's network capabilities and/or other resources, to thereby enable network communication.

The storage device with a non-volatile memory retains its stored content or stored state even after power is removed. The storage device may alternatively be based on erasable programmable memory technologies, including but not-limited to electrically-erasable and programmable read-only memories (EEPROMs), EPROM, magnetic random access memories ferroelectric random access memories (FRAMs), and phase change random access memories (PRAMs). Note that the storage device configuration does not depend on the type of removable memory, and may be implemented with any type of memory, whether it is a flash memory or another type of memory.

In general, host systems that use such storage devices may be substantially any system which sends and retrieves data or information to and from the storage device, including personal computers (PCs), notebook computers and various mobile and handset devices, such as hand held computing devices, digital cameras, video cameras, cellular communication devices, audio and video reproducing devices, digital music players such as MP3 players, global positioning devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices.

FIG. 1 illustrates one system 100 for extending the memory capacity as suggested above. System 100 includes a host device 102 and a storage device 104 coupled to it. Storage device 104 includes a memory 204, a controller 202, a host interface 108 for coupling with host device 102, and a storage device interface 110 that is operable to couple with an add-on memory 112 of a removable device. Storage device 104 may be a removable device, a memory card for example, that is removably coupled to host device 102 or, alternatively, an embedded device installed in host device 102. The add-on memory 112 may be any removable storage device capable of being inserted into, or connected to host device 102. In FIG. 1, the storage device 104 is connected to the host device 102 and the add-on memory 112 interacts and communicates with host device 102 via the storage device 104. The host device 102 may include a host processor 128, a volatile RAM 120, a keyboard interface 124, a display interface 126 and storage interface 122, among other units and functionalities.

Host interface 108 may conform to an embedded Multi-Media Card (eMMC) port specification, embedded Secure Digital (eSD) port specification, or to any other interface protocol capable of connecting the storage device with a host device. Storage device interface 110 may conform to a Multi-Media Card (MMC) port specification, Secure Digital (SD) port specification, or to any other interface protocol capable of coupling with an add-on memory of a removable device. Storage device interface 110 may facilitate wired or wireless communication between storage device 104 and add-on memory 112. Accordingly, storage device interface 110 and host interface 108 may be of the same or of different configuration types.

Storage device 104, when coupled between the host device 102 and the add-on memory 112, is operable to route data transfer commands from host device 102 to add-on memory 112 and transfer data therebetween. More specifically, storage device 104 is configured to receive and handle data transfer commands from host device 102, where a data transfer command specifies a memory address among other parameters. If the specified memory address is associated with the address space in storage device 104, then storage device 104 handles the data transfer command by interfacing with its local, embedded memory. If the specified memory address is outside the initial address space on the storage device, then storage device 104 routes the command to add-on memory 112, to be handled by add-on memory 112.

Once the command is handled by the add-on memory, storage device 104 operates as a router (this time from add-on memory 112 to host device 102), to route a response to the data transfer command. For example, the response may include data that is retrieved form the memory in response to a read command, or any other form of a response message in case of a write command that is transmitted from add-on memory 112 back to host device 102. The routing via the storage device 104 of a response or a response message from the add-on memory 112 to the host device 102 (i.e. to the host file system or host driver) is transparent to the host and no special actions are needed by it.

Note that the address space of the storage device and the address space of the add-on memory 112 are addressed as one integral address space to the host device 102. More specifically, add-on memory 112, when removably connected to host device 102 provides an extended address space (or extended storage space) in communication with host device 102. The extended address space is presented to a host device 102 as an integral address space of storage device 104, with both areas of address spaces (the initial address space and the extended address space) operating as one storage space transparently to the host, i.e. as an address space that acts as if it were entirely the address space of storage device 104. The way storage device 104 operates to route data transfer commands from host device 102 to add-on memory 112 and to transfer data therebetween will be described in more detail below in connection with FIG. 5.

Figure 2:
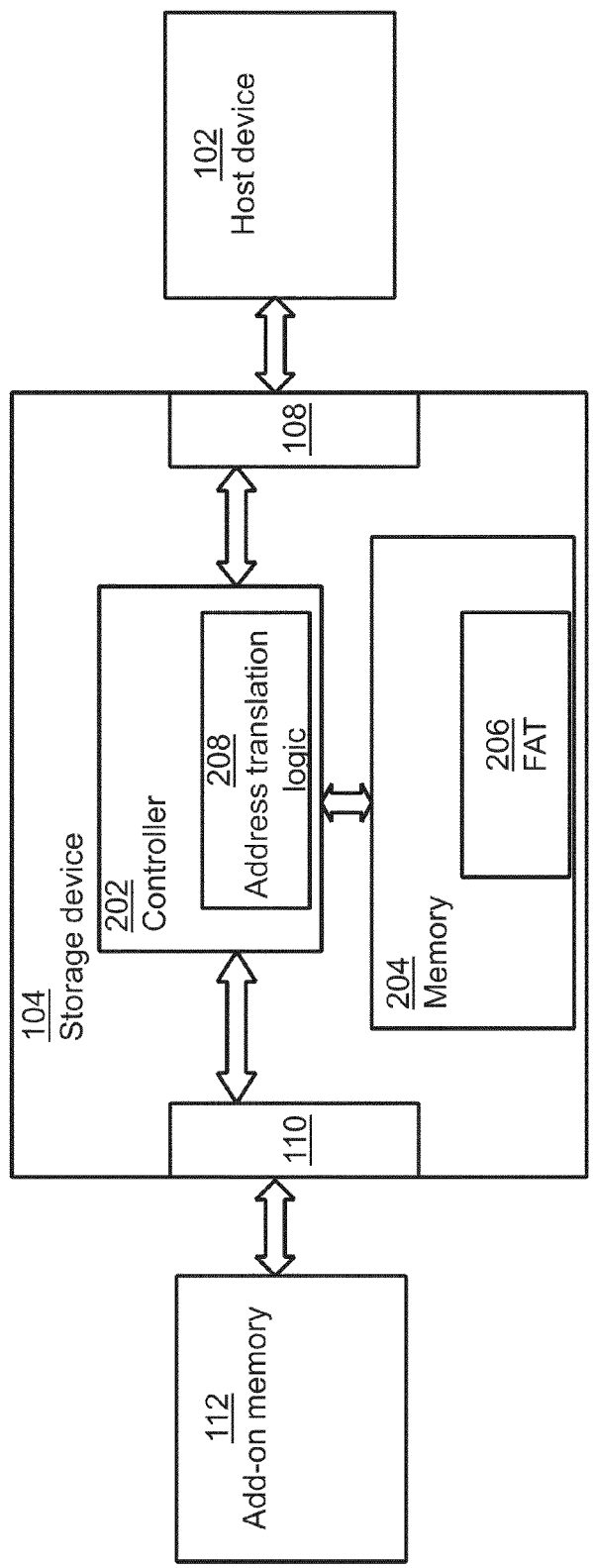
FIG. 2 is a block diagram of a storage device according to an example embodiment.

FIG. 2 is a block diagram of a storage device according to an example embodiment. FIG. 2 will be described in association with FIG. 1. Storage device 104 includes controller 202, memory 204, typically of a non-volatile flash-based memory technology, host interface 108 and a storage device interface 110, for connecting with host device 102 and coupling with add-on memory 112, respectively.

Controller 202 is operable to interface with a host device 102 and to manage data transfer therebetween via host interface 108, and also to interface with an add-on storage device (such as add-on memory 112) and to manage data transfer therebetween via storage device interface 110. Storage device interface 110 may facilitate wired or wireless communication between storage controller 202 and add-on memory 112 that is removably connected to it. Again, storage device interface 110 and host interface 108 may conform to an SD (secure digital) port specification, or to an embedded multi-media content (eMMC) port specification, among others. Storage device interface 110 and host interface 108 may be of the same or of different configuration types.

Memory 204 may be formatted by a manufacturer of storage device 104 with a file allocation table (FAT) to enable extending the storage capacity of the storage device without reformatting the memory in storage device 104 (avoiding the need to recreate the FAT). Initially, at a time of manufacturing (for example during the initialization of memory 204 in storage device 104), memory 204 is formatted with a file allocation table 206 created therein, such as Microsoft FAT16 or FAT32. In general, a file allocation table, such as FAT32, is a computer file system architecture that is created for and used on many computer systems and memory cards. When used on a memory card or any other portable memory device, the file allocation table is managed by a host to which the memory card is coupled, i.e. accessible to and further manageable by a host to which the memory card is coupled to. Each entry in the file allocation table may also be called cluster. The file system may be used by a host to indicate used and available clusters on the memory device, which could then be quickly looked up in order to find free storage areas in the memory. In computer file systems, a cluster is the unit of storage space allocation for files and directories built up of one or more sectors.

Returning to FIG. 2, memory 204 is formatted, or initiated with a file allocation table (e.g. FAT 206) created therein to contain entries for locations that are beyond the storage capacity of storage device. More specifically, memory 204 is formatted with FAT 206 to contain entries for locations (e.g. of clusters) in the storage device and entries for locations (e.g. of clusters) in an add-on memory of a removable device. The add-on memory (e.g. add-on memory 112) may be a mass storage area of any removable storage device capable of working with storage device 104. Such memory configuration allows extending the storage capacity of storage device 104 at a later point of time without reformatting the memory 204 in the storage device. Memory 204 may be formatted to contain a file allocation table of any size (i.e. number of entries), thus to meet different add-on memory sizes for example. A memory installation as such will be described in more detail in connection with FIG. 3C.

Controller 202 operates to route data transfer commands, such as a read or write command, from host device 102 and add-on memory 112 and to transfer data therebetween as follows: Controller 202 may receive a data transfer command from host interface 108 to read (e.g. a particular sector) or write data from memory 204. The data transfer command specifies, to controller 202, a memory address. If the specified memory address is within the address space of memory 204, controller 202 reads or writes the data from/to the specified memory address in the memory 204. However, if the specified memory address is beyond the address space of memory 204, controller 202 routes the data transfer command to storage device interface 110 for access to the add-on memory (e.g. add-on memory 112). The address translation is transparent to the host device; the host device addresses the address space of memory 204 and the address space of add-on memory 112 as one integral address space.

The routing of the data transfer command to an add-on memory may involve translating the specified memory address via a pre-defined logic, e.g. address translation logic 208. Address translation logic 208 unit is a software, firmware, and/or hardware component, embedded to operate as an integral part of controller 204 for example, to perform a translation process for translating memory addresses to locations beyond the address space of the memory 204. Address translation logic 208 may translate the specified memory address via the logic implementation, to be properly interpreted by the logic of the add-on memory. According to an exemplary logic implementation, address translation logic 208 is configured to translate a specified memory address by subtracting the number of sectors associated with the address space of memory 204 from the specified memory address. More specifically, address translation involves obtaining the logical address of a sector(s) associated with a specified memory address, and then identifying a corresponding physical location. If the identified physical location is beyond the beyond the address space of memory 204, then address translation logic 208 subtracts the number of sectors associated with the address space of memory 204 from the obtained logical address. The way storage device 104 operates to translate memory addresses will be described in more detail below in connection with FIG. 6.

In case the data transfer command is routed to add-on memory 112 and handled by add-on memory 112, controller 202 may be typically operative to route a response coming in from add-on memory 112, back to host device 102. Add-on memory 112 may generate a response in correspondence with the (routed) command. For example, the response may include read data in case of a read command, or may be a response message in case of a write command. Controller 202 may route the response from storage device interface 110 to host interface 108 (i.e. from add-on memory 112 back to host device 102).

FIG. 3A illustrates a file allocation table according to an example. FIG. 3A will be described in association with FIG. 1. The memory 204 is formatted, or initialized with a file allocation table (e.g. FAT 206A) to hold entries pointing to locations in an initial address space; and entries pointing to locations in an extended address space. The initial address space is typically associated with the address space of the (embedded) memory 204; the extended address space (at least a portion of it) may be associated with an address space of a possible add-on memory. For example, with FAT 206A having entries to a 4 Gbyte extended address space, the 4 Gbyte extended address space can manage, or contain up to a 4 GByte address space connectable device. As such, the address space of add-on memory may occupy the entire entries to the extended address space, or only part of the entries to extended address space in FAT 206A. Again, the initial address space and the extended address space are addressed as one integral address space within the memory 204 transparently to a connectable host device i.e. as if it were one integral address space of the storage device 104.

The size of FAT 206A depends on the cluster size. For example, if cluster size is 32 KB, one cluster contains 64 sectors, where one sector is used to represent ½ KB (Kilo byte). Mapping 1 GB (Giga byte) with a cluster size of 32 KB requires allocation of 32,768 entries in the file allocation table. Accordingly, mapping 5 GB with the same cluster size requires allocation of 163,840 entries in the file allocation table.

A particular implementation of FAT 206A includes the storage device 104 of FIG. 1 having a local memory 204, which may include a 1 GByte initial address space, where one sector is used to represent ½ KB (Kilo byte). Memory 204 may be formatted with FAT 206A to contain entries for locations in a 1 Gbyte initial address space and additional entries for locations in a 4 GByte extended address space.

In this example, FAT 206A is created in memory 204 to contain a first group of entries 220A in sector addresses 0 to 1,999,999; and a second group of entries 230A in sector addresses 2,000,000 to 9,999,999. The first group of entries 220A is associated with a 1 Gbyte initial address space in (embedded) memory 204, for mapping a 1 Gbyte initial address space in cluster addresses 0 to 32767 or sector addresses 0 to 1,999,999. The second group of entries 230A is associated with a 4 Gbyte extended address space, for mapping an extended address space of 4 GB in clusters addresses 32768 to 163,839 or sector addresses 2,000,000 to 9,999,999.

Initially, i.e. prior to mounting an add-on memory to storage device 104, entries to locations in the extended address space are marked as unavailable in FAT 206A. When an add-on memory 112 is present and coupled to the memory 204, the entries associated with the add-on memory are made available (see FIG. 3B). Per the example of FIG. 3A, entries 230A in FAT 206A are marked as unavailable or invalid in a host device, marked as '−1' for example. Entries in the extended address space will be marked as valid as appropriate (i.e. according to the address space of an add-on memory) upon detecting connection with an add-on memory, such as add-on memory 112, or any other removable device.) A way of formatting the memory with a file allocation table created as such will be described in more detail in connection with FIG. 5.

The size of FAT 206A may vary according to implementation. For example, FAT 206A may hold entries mapping an extended address space of 4 Gbyte size. The extended address space reflects the anticipation of, or the need for extending the storage capacity of the storage device 102 without the need to reformat its memory 204 (avoiding the need to recreate the FAT). The required size may be set automatically by the operating system of a host device or by a user, for example at a time the memory (e.g. memory 204) is formatted with the storage device 104 being coupled to the host device. Alternatively, the required size of FAT 206A may be set by or in the storage device itself, for example by implementing the storage device with the required size hard-coded thereon, and provided to the host device by the storage device.

FIG. 3B is a schematic illustration showing a file allocation table in the storage device after the insertion of an add-on memory, according to an example embodiment. FIG. 3B will be described in association with FIG. 3A. In a similar manner to FIG. 3B, memory 204 is formatted with file allocation table (e.g. FAT 206B) to hold 163840 entries as follows: 32768 entries are allocated for locations of a 1 Gbyte initial address space (i.e. sector addresses 0 to 1,999,999); and additional 131072 entries are provided for a 4 GB extended address space (i.e. sector addresses 2,000,000 to 9,999,999) of a possible add-on memory.

Again, with FAT 206B having entries to a 4 Gbyte extended address space, the logic implementation proposed in the exemplary logic implementation can manage up to a 4 GByte address space connectable device. In this example, the 1 GB storage device 102 is coupled to a 1 GB add-on memory (e.g. add-on memory 112), and thus the address space of add-on memory occupies only part of the entries to extended address space in FAT 206B.

With the storage device coupled to an add-on memory, e.g. add-on memory 112, entries 222B (in cluster addresses 32,556 to 65,536 or sector addresses 2,000,000 to 3,999,999) are associated with locations in the add-on memory and made available in connection with a host device. Again, the extended address space is presented to a host device as an integral address space of storage device 104. Stated differently, entries to cluster addresses 0 to 65,536 in FAT 206B are presented to the host device as one integral memory. Note that the remaining entries in FAT 230B (cluster addresses 65536 to 163839 or sector addresses 4,000,000 to 9,999,999) may be reserved for future use and marked unavailable.

Figures 4A, 4B:
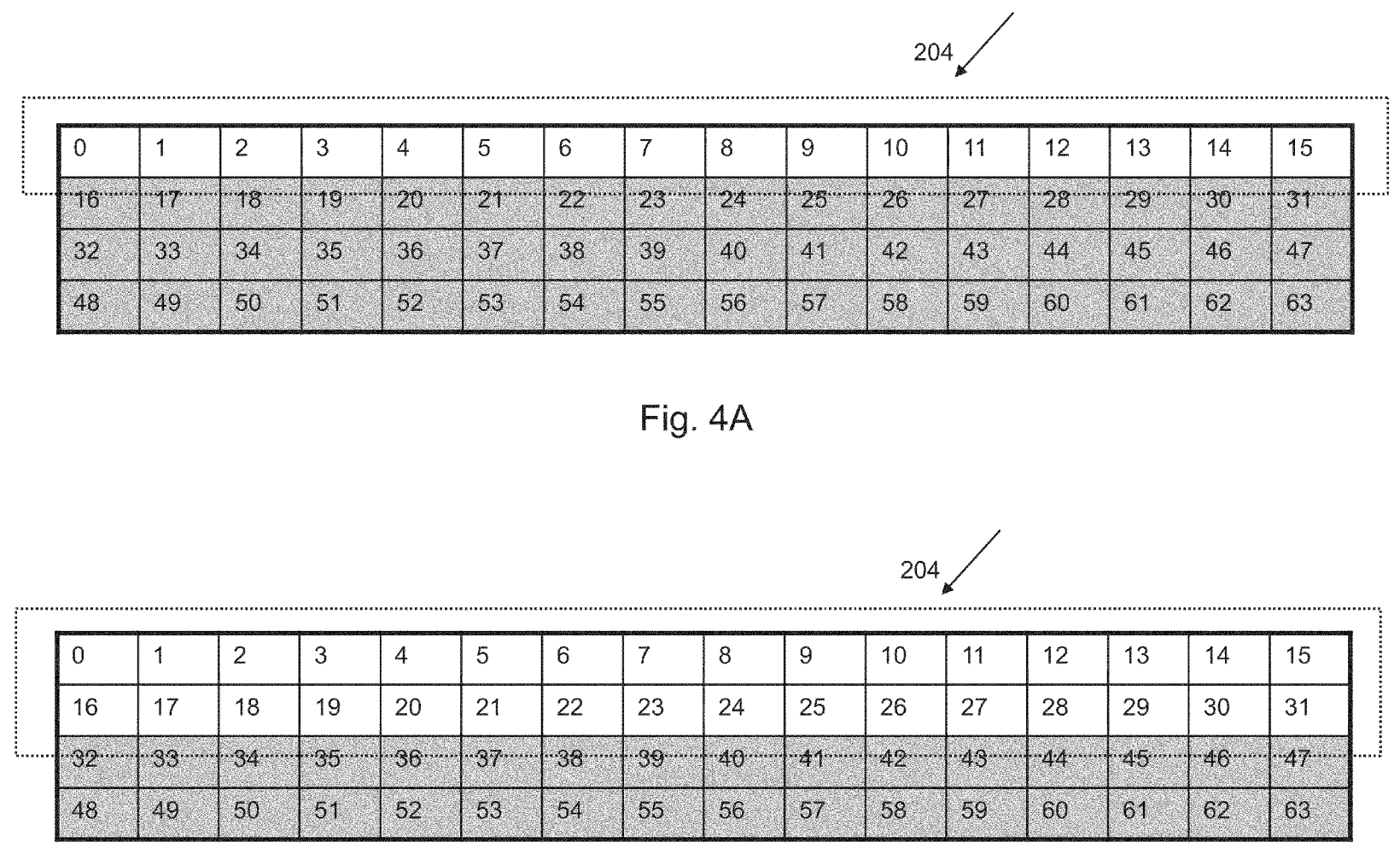

FIG. 4A is a schematic illustration showing a memory installation according to an example embodiment. FIG. 4A will be described in association with FIG. 1. In FIG. 4A the memory (e.g. memory 204) is formatted, or initialized with a file allocation table (e.g. FAT 206A) to hold entries to locations of 64 clusters (clusters 0 to 63), in such a way that a first group of entries in the FAT are pointing, or associated with locations of clusters 0 to 15 in an initial address space in memory 204; and a second group of entries in FAT are pointing, or associated with locations of clusters 16 to 63 in an extended address space in a possible add-on memory of a removable storage device. Stated differently, clusters in clusters 0 to 15 are associated with an initial address space in memory 204; and clusters 16 to 63 are associated with an extended address space in a possible add-on memory (e.g. add-on memory 112) of a removable storage device.

As shown in FIG. 4A, prior to mounting an add-on memory to storage device 104 the first group of entries pointing to locations of clusters 16 to 63 in the extended address space are marked as unavailable in FAT (marked as '−1' for example), such that these clusters are made unavailable or invalid to a host device. When an add-on memory is present and coupled to the memory 204, clusters associated with the add-on memory are made available and accessible to a host device (see FIG. 4B).

At this stage, the host device may perform various file system operation, e.g. read or write operations, by using any cluster(s) 0 to 15. For example, the host device may create (write) a file, or read data from a file located anywhere in clusters 0 to 15 in memory 204.

FIG. 4B is a schematic illustration showing the memory installation after the insertion of an add-on memory, according to an example embodiment. FIG. 4B will be described in association with FIG. 4A. In a similar manner to FIG. 4B, memory 204 is formatted with file allocation table (e.g. FAT 206B) to hold entries to locations of 64 clusters (i.e. clusters 0 to 63), such that clusters 0 to 15 are associated with an initial address space in memory 204; and clusters 16 to 63 are associated with an extended address space in a possible add-on memory (e.g. add-on memory 112) of a removable storage device.

With the storage device coupled to an add-on memory, e.g. add-on memory 112, clusters in the extended address space that are associated with locations in the add-on memory are made available in connection with a host device. Per FIG. 4B, clusters 16 to 31 in the extended address space made available in connection with a host device. At this stage, clusters 0 to 31 are presented to a host device as an integral address space of storage device 104. Note that the remaining clusters 32 to 63 (and corresponding entries in FAT 230B) may be reserved for future use and marked unavailable. Accordingly, at this stage, the host device may perform various file system operation, e.g. read or write operations, by using any cluster(s) 0 to 31. For example, the host device may create (write) a file, or read data from a file located anywhere in clusters 0 to 31 in memory 204.

Figure 5:
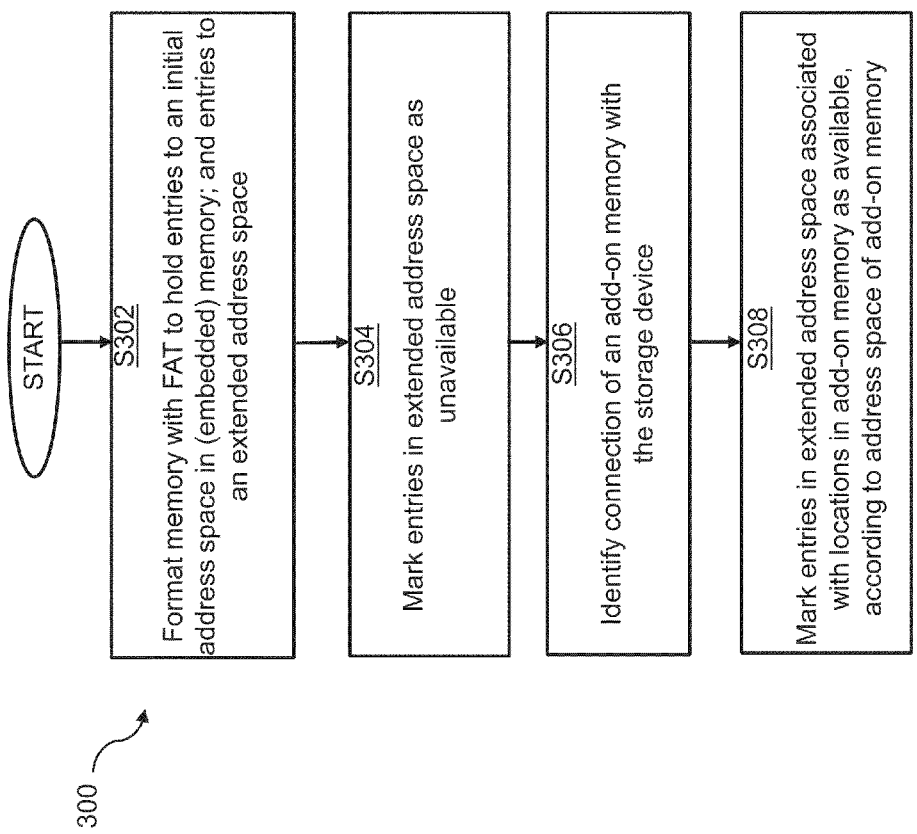
FIG. 5 is a flow diagram of a formatting process of the storage device with the file allocation table according to an example embodiment.

FIG. 5 is a flow chart of a formatting process 300 according to an example. FIG. 5 will be described in association with FIG. 1. Formatting process 300 is typically performed by an application executable on a host device (e.g. during manufacturing of the storage device in the host device), for configuring a memory in a storage device mounted in a host device. The application may be prompted on the host device manually, i.e. by a user, upon coupling the removable storage device into the storage device 104, or automatically by the operating system of the host device or another application, and may be resident on the host device or downloaded onto the host device from the storage device 104. Alternatively, the storage device 104 can be implemented to access FAT 206 and, upon detecting connection of an add-on memory, to mark as valid the appropriate entries in FAT 206 according the address space of the add-on memory. Storage device 104 may then notify the host device accordingly. A particular implementation of formatting process 300 includes the storage device 104 of FIG. 1, which is formatted at a time of manufacturing to include a file allocation table created for the memory and for an add-on memory.

Initially, step S302 involves formatting, or initializing the memory (i.e. memory 204) to contain a file allocation table (e.g. FAT 206). FAT 206 is created to have entries to locations in an initial address space in memory 204 and entries to locations in an extended address space. Again, FAT 206 may be of any size and may contain or hold enough entries for any arbitrary size add-on memory. The size of FAT 206 may vary according to implementation, and may be determined automatically by the operating system of a host device at S302, provided by a user, or, alternatively, be hard-coded onto the storage device. For example, in a 1 GB storage device, during the formatting process FAT 206 may be created to hold a first group of entries to locations within the 1 Gbyte initial address space of memory 112; and a second group of entries to locations in an up to 4 Gbyte extended address space of an add-on connectable device.

Next, at S304, the second group of entries in FAT 206 that are associated with locations in the extended address space are marked as unavailable, or as invalid (e.g. marked as '−1'); to be presented as 'unavailable' to any connectable host device. The marking of these entries may depend on the file system implementation. For example, in a FAT32 file system these entries may be marked as a 'bad block', e.g. 0xFFFFFFF7. This entire group of entries in the FAT 206 are marked as invalid as long as an add-on memory is not connected to (e.g. operatively coupled to) the storage device 104.

At S306, with a removable device (i.e. add-on memory 112) present and coupled to the storage device 104, the host device detects connection of add-on memory 112. In general, a host device may detect connection of a removable device in a variety of ways. In an exemplary implementation, controller 202 may be operable to detect connection of an add-on memory and, as a response, to notify the host device by transmitting to the host device a corresponding message or a signal. Controller 202 may detect connection of an add-on memory by polling storage device interface 110, or for example by interoperating with storage device interface 110 for sensing connection via electrical contacts (where an electrical contact is made only when an add-on memory is connected). Another way may be by interoperating with a sensing mechanism (such as an on/off switch) on the storage device interface 110 that senses connection of a removable device.

In response to detecting connection of an add-on memory, the application running on the host changes the marking of invalid entries according to the address space of the add-on memory. Changing the marling to available or valid makes entries in the FAT associated with locations in the add-on memory available for the host device. At S308, the application on the host may change the marking of the appropriate entries by marking them as '0' for example. Per the example provided above, in the formatting of memory 204 FAT 206 is created to contain 131,072 entries to locations in a 4 Gbyte extended address space. Connection of a 1 Gbyte add-on memory will prompt the application on the host to change the markings of only 32,768 entries, making them available for the host device. Whereas, connection of a 4 Gbyte add-on memory will prompt the application running on the host to change the markings of all 131,072 entries associated with the extended address space in FAT 206, making them all available for the host device (or for any other connectable host).

Thus, a method of configuring a memory in a storage device mounted in a host device includes formatting the memory of the storage device to create and contain a file allocation table; and later enables updates to the file allocation table. The file allocation table formatting creates entries associated with an initial address space (of the memory in the storage device) and entries associated with an extended address space; and marking the entries associated with the extended address space as unavailable if an add-on memory is not available. This excludes such entries from the memory space available for accommodating content. The marking is performed, such that if an add-on memory is present and coupled to the memory of the storage device entries associated with the extended address space are made available according to the address space of the add-on memory. The method provides for updates to the file allocation table through marking of corresponding entries in it when the memory space is extended (by the add-on memory) or reduced (by removal of some or all of the add-on memory). Advantageously, creating and updating the file allocation table in the memory of a storage device mounted in a host device enables extension of the storage capacity of the storage device transparently to the host and without the need to erase any existing content stored on the storage device and without the need to re-format the memory of the storage device (avoiding the need to recreate the FAT).

Figure 6:
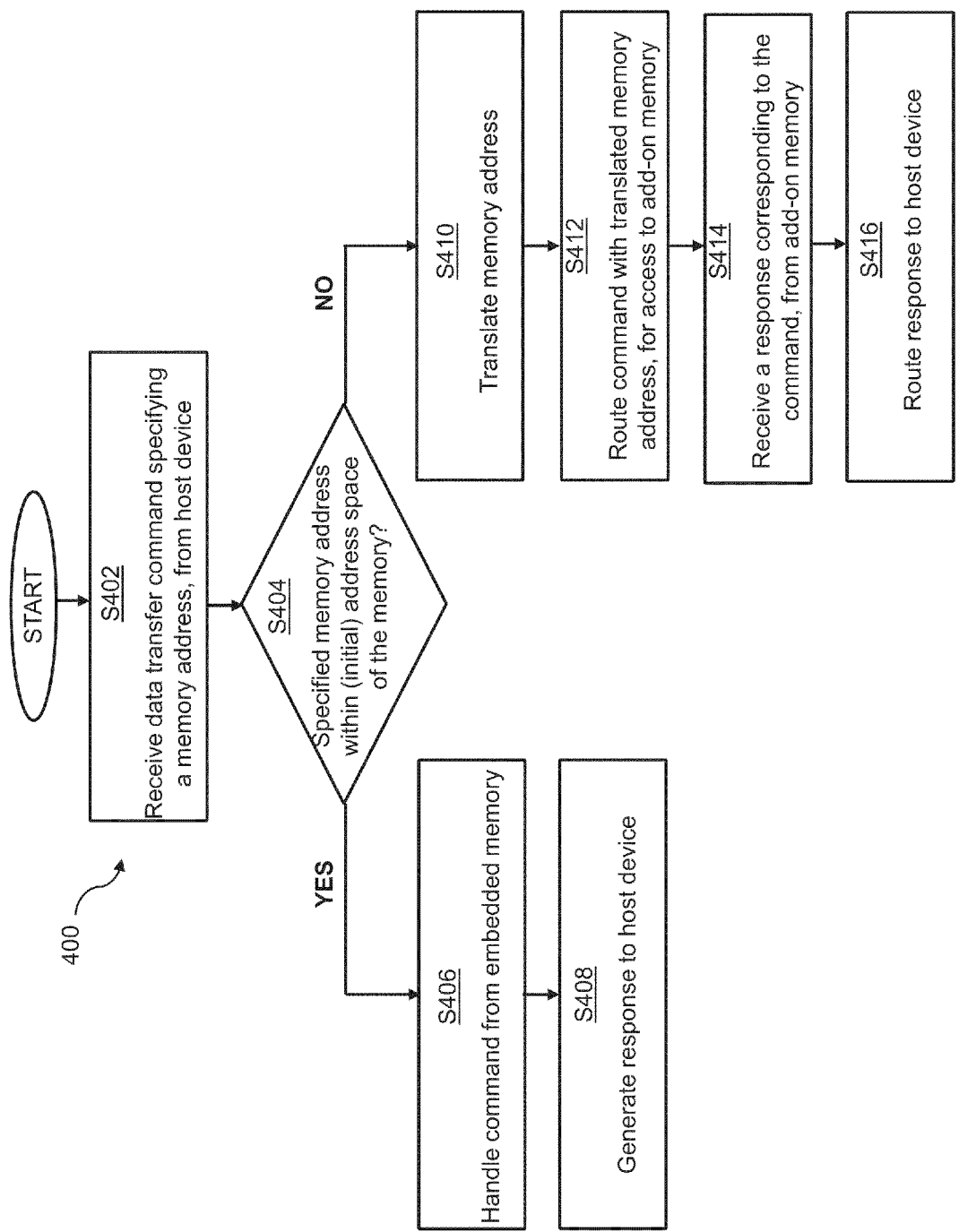
FIG. 6 is a flow diagram of a data transfer process according to an example embodiment.

FIG. 6 is a flow chart of a data transfer process 400 according to an example embodiment. FIG. 6 will be described in association with FIG. 2. The data transfer process 400 will be performed by a storage device controller, e.g. controller 202, at the storage device 104 which is operatively coupled to a host device and to which an add-on memory (e.g. add-on memory 112) is removably connected. A particular implementation of the data transfer process 400 includes the storage device 104 of FIG. 1, which may be a 1 GByte embedded memory device (e.g. memory 204), where one sector is used to represent ½ KB (Kilo byte) and where in the formatting of memory 204 FAT 206 is created to contain entries to an initial address space of 1 GByte (of the embedded memory device) and entries to an extended address space of 4 GByte.

Initially, at step S402, controller 202 receives from the host device a data transfer command. For example, the data transfer command may be in form of a read command (or a write command) instructing the controller to read data from (or to write data to) a specified memory address in memory 204.

Upon receiving the command, controller 202 verifies whether the specified memory address (as received from the host) is within the address space of memory 204, or whether the specified memory address is beyond the address space of memory 204 (and therefore within the address space of add-on memory 112). Continuing with the memory configuration described herein in the example of FIG. 6, in FAT 206 with entries for an address space of 1 GByte and an extended address space of 4 GByte, controller 202 may determine whether the specified memory address is within the 1 GByte address space of memory 204 by checking if the memory address specifies a location of a sector ranging between 0 to 1,999,999. Accordingly, controller 202 may determine whether the specified memory address is beyond the address space of memory 204 by checking if the memory address specifies a location of a sector anywhere greater than 2,000,000.

If the memory address is within the address space of memory 204 (shown as "YES" at S404), then controller 202 handles the command (e.g. reads or writes data) from the specified location in the (e.g. embedded) memory (step S406), and generates a response that corresponds to the data transfer command to the host device (step S408). The response may include read data in case of a read command, or a response message in case of a write command.

However, if the specified memory address is beyond the address space of memory 204 (shown as "NO" at S404), then at step S410 controller 202 translates the specified memory address by subtracting the number of sectors in the memory of the storage device from the specified memory address. For example, with controller 202 receiving at S402 a data transfer command specifying memory address 2,000,500, controller 202 may translate this memory address by subtracting from it the number of sectors in the memory (i.e. 2,000,000 sectors). Thus, the translated memory address is associated with the location of sector 500 in the add-on memory 112. At S412 controller 202 routes the command with the translated memory address, for access to and handling of the add-on memory. The add-on memory receives the command, with the translated memory address specifying the location of sector 500 in add-on memory 112.

In general, after the command is handled by the add-on memory, controller 202 routes a response that corresponds to the data transfer command (e.g. read data in case of a read command, or a response message in case of a write command) from the add-on memory back to the host device. Specifically, at S414, controller 202 receives a response that corresponds to the data transfer command from the add-on memory and routes the response back to the host device at S416. Note that in case the specified memory address is beyond the address space of the add-on memory, the routed command will be handled in the add-on memory accordingly, for example by generating an "out of range" error message back to the storage device 102.

Figure 7:
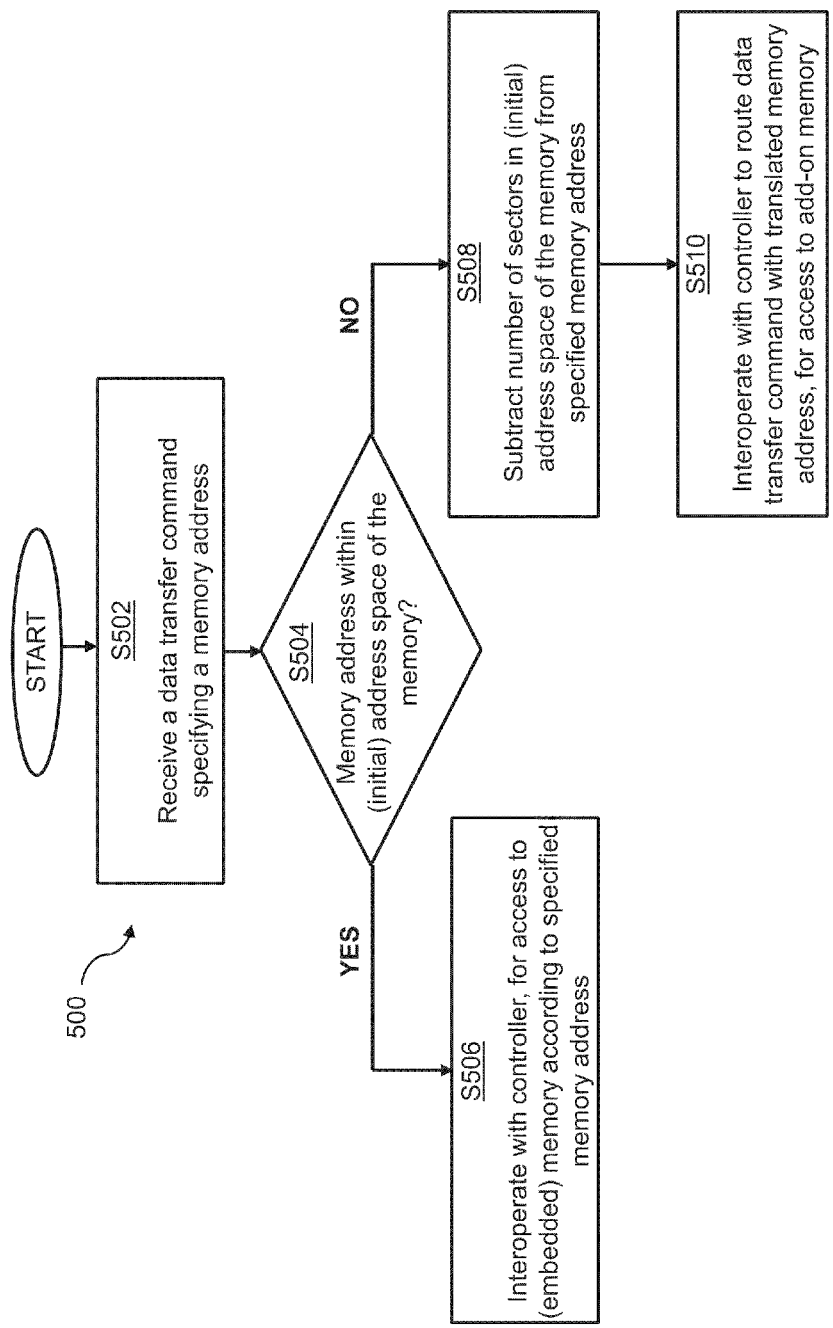
FIG. 7 is a flow diagram of an address translation process according to an example embodiment.

FIG. 7 is a flow diagram of an address translation process 500 according to an example embodiment. FIG. 7 will be described in association with FIG. 2. Address translation process 500 will be performed by address translation logic 208, typically as part of the operation of the controller, at the storage device 104 operatively coupled to a host device and removably connected to an add-on memory (e.g. add-on memory 112). Again, a particular implementation of the address translation process S500 includes the storage device 104 of FIG. 1, which may be a 1 GB embedded memory device (e.g. memory 204), where one sector is used to represent ½ KB (Kilo byte) and where FAT 206 is created to contain entries to an address space of 1 GB and entries to an extended address space of 4 GB.

Initially, at step S502, address translation logic 208 receives, as input, a data transfer command specifying a memory address. The data transfer command is typically a command (e.g. a read or write command) that is transmitted to the storage device from the host device.

Upon receiving the command, address translation logic 208 identifies a corresponding physical location. If the identified physical location is beyond the beyond the address space of the memory 204, address translation logic 208 subtracts the number of sectors associated with the address space of memory 204 from the obtained logical address. verifies (at step S504) whether the specified memory address is within the (initial) address space of the memory 204, or whether it is beyond the address space of memory 204. Per the memory configuration brought herein in the example of FIG. 7, in FAT 206 containing entries to an initial address space of 1 GB and entries to an extended address space of 4 GB, address translation logic 208 may determine whether the specified memory address is within the address space of memory 204 by obtaining the logical address of a sector(s) associated with a specified memory address, and then identifying a corresponding physical location of a memory address. Address translation logic 208 then checks if the identified physical location is beyond the beyond the address space of the memory 204, i.e. if the memory address specifies a location of a sector ranging between 0 to 1,999,999. Accordingly, address translation logic 208 may determine whether the specified memory address is beyond the address space of memory 204 by checking if the memory address specifies a location of a sector anywhere greater than 2,000,000.

If the memory address is within the 1 GByte address space of memory 204 (shown as "YES" at S504), then address translation logic 208 interoperates with controller 202, for access to memory 204. Specifically, address translation logic 208 may interoperate with controller 202, prompting controller to handle the command (e.g. read or write data) from/to the specified memory address in memory 204.

However, if the memory address is beyond the address space of memory 204 (shown as "NO" at 5504) then the memory address pertains to the add-on memory of the connectable device. In such case, address translation logic 208 translates (at step S506) the memory address to be within the address space of the add-on memory, for being correctly interpreted and handled by the connectable device. Address translation logic 208 performs the translation by subtracting, at S506, the number of sectors within the 1 GByte address space in the (embedded) memory 204 from the specified memory address. For example, with the memory address specifying location 2,000,500, the translated memory address would specify location 500 (2,000,500−2,000,000) in add-on memory 112. Then, at S510, address translation logic 208 interoperates with the controller 202, prompting controller 202 to route the data transfer command with the translated memory address, for access to the add-on memory.

In sum, a storage device comprising a memory, a host interface, a storage device interface and a controller, and a method for data transfer to and from a storage device, are provided to illustrate the various possible embodiments. The storage device is operative to connect with a host device and to operatively couple to an add-on memory via a host interface and a storage device interface, respectively. When the host interface is connected to a host device and the storage device interface is coupled to an add-on memory, the controller receives a data transfer command from the host device interface; and determines whether a memory address that is specified by the data transfer command is beyond the address space of the memory. If the specified memory address is beyond the address space of the memory, the controller routes the data transfer command to the storage device interface, for access to the add-on memory. The address space of the memory and the add-on memory are addressed as one integral address space transparently to the host (i.e. as one integral address space from the host point of view).

The proposed disclosure further provides a method for configuring a memory in a storage device that is mounted in a host device. The storage device has a storage device interface for coupling with an add-on memory. The method includes formatting a storage device to contain a file allocation table in the memory. The file allocation table has entries associated with an address space of the memory and entries associated with an add-on memory. The method also includes marking the entries in the file allocation table that are associated with the add-on memory as unavailable. The process of marking the entries in the file allocation table is performed such that if the add-on memory is present and coupled to the memory, then entries associated with the add-on memory are made available.

It should be noted that although the foregoing embodiments have been described in considerable detail with reference to certain preferred versions thereof, other embodiments and versions are possible. Therefore, the spirit and scope of the appended claims should not be limited to the description of the preferred embodiments and versions contained herein. It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method of data transfer to and from a storage device having a memory, a controller, a host interface and a storage device interface, the host interface is connected to a host device, and the storage device interface is capable of being coupled to an add-on memory, the method comprising:
if the storage device is not coupled to the add-on memory, storing in the storage device a file allocation table with entries beyond the storage capacity of the storage device, the file allocation table having entries for an initial address space of the storage device and entries for an extended address space, at least a subset of the entries for the extended address space are for locations in the add-on memory that will extend the capacity of the storage device at a later time, the entries in the file allocation table that are for the extended address space are marked as unavailable;
receiving a data transfer command from the host interface, the data transfer command specifying a memory address;
if the specified memory address is beyond the address space of the memory and the storage device is coupled to the add-on memory, routing the data transfer command to the storage device interface for access to the add-on memory, wherein the address space of the memory and an address space of the add-on memory are addressed as one integral address space transparently to the host device; and
if the storage device is coupled to the add-on memory, storing the file allocation table with at least a subset of entries for the extended address space that are for locations in the add-on memory being marked as available.

2. The method of claim 1, wherein the memory is an embedded memory device and the add-on memory is a removable storage device capable of being connected to the host device.

3. The method of claim 2, wherein the memory is formatted by a manufacturer of the storage device to enable transfer of content to and from the host device beyond the address space of the memory.

4. The method of claim 1, wherein the routing involves translating the specified memory address via defined logic.

5. The method of claim 1, further comprising:
routing a response to the data transfer command, the response routed from the storage device interface to the host interface.

6. The method of claim 1, further comprising:
coupling the add-on memory to the storage device and using the add-on memory without erasing existing content previously stored in the storage device and without re-formatting the storage device.

7. A storage device, comprising:
a host interface operative to connect with a host device;
a storage device interface operative to couple with an add-on memory;
a memory storing an allocation table having entries for an initial address space of the storage device and entries for an extended address space, prior to coupling the storage device to the add-on memory via the storage device interface at least a subset of the entries for the extended address space are for locations in the add-on memory that will extend the capacity of the storage device at a later time after coupling the add-on memory to the storage device and the entries for the extended address space that are for locations in the add-on memory are marked as unavailable, after coupling the add-on memory to the storage device at least a subset of the entries for the extended address space that are for locations in the add-on memory are marked as available;
a controller configured to, when the host interface is connected to a host device and the add-on memory is coupled to the storage device:
receive a data transfer command from the host interface, the data transfer command specifying a memory address, and
if the memory address is beyond the address space of the memory, route the data transfer command to the storage device interface for access to the add-on memory, wherein the address space of the memory and an address space of the add-on memory are addressed as one integral address space transparently to the host device.

8. The storage device of claim 7, wherein the memory is an embedded memory device and the add-on memory is a removable storage device capable of being connected to the host device.

9. The storage device of claim 7, wherein the storage device is a memory card.

10. The storage device of claim 7, wherein:
prior to coupling the storage device to the add-on memory via the storage device interface, the file allocation table stores entries beyond the storage capacity of the storage device.

11. The storage device of claim 10, wherein:
the add-on memory can be connected to the storage device and the storage device is configured to use the add-on memory without erasing existing content previously stored in the storage device and without re-formatting the storage device.

12. The storage device of claim 7, wherein when the controller routes the data transfer command to the storage device interface, the controller translates a specified memory address via pre-defined logic.

13. The storage device of claim 7, in which the controller is further configured to:
route a response to the data transfer command, the response routed from the storage device interface to the host interface.

14. The storage device of claim 13, wherein when the controller routes the response, the controller translates a memory address via pre-defined logic.

15. The storage device of claim 7, wherein:
the add-on memory can be connected to the storage device and the storage device is configured to use the add-on memory without recreating the file allocation table.

16. The storage device of claim 7, wherein either one of the host interface or the storage device interface conforms to an SD (secured digital) port.

17. The storage device of claim 7, wherein either one of the host interface or the storage device interface conforms to an eMMC (embedded multi-media content) port.

18. The storage device of claim 7, wherein the memory is non-volatile flash-based memory technology.

19. A method for configuring a memory in a storage device mountable to a host device, the storage device having a storage device interface for coupling with an add-on memory, the method comprising:
- prior to coupling the storage device to the add-on memory, formatting the memory to contain a file allocation table with entries beyond the storage capacity of the storage device, the file allocation table having entries associated with an initial address space of the memory and entries associated with an extended address space, the entries associated with the extended address space are for locations in the add-on memory that will extend the capacity of the storage device at a later time; and
- prior to coupling the storage device to the add-on memory, marking the entries in the file allocation table that are associated with the extended address space as unavailable, such that if an add-on memory is present and coupled to the memory entries associated with the extended address space are made available according to the address space of the add-on memory,
- wherein the extended address space is addressed as one integral address space within the memory transparently to a connectable host device.

20. The method of claim 19, wherein the memory is formatted by a manufacturer of the storage device to enable distribution of content to and from a host device beyond the address space of the memory.

21. A method for operating a storage device mountable to a host device, the storage device having a storage device interface for coupling to an add-on memory, the method comprising:
- prior to coupling the storage device to the add-on memory, storing in the storage device a file allocation table with entries beyond the storage capacity of the storage device, the file allocation table having entries for an initial address space of the storage device and entries for an extended address space, at least a subset of the entries for the extended address space are for locations in the add-on memory that will extend the capacity of the storage device at a later time, prior to coupling the storage device to the add-on memory the entries in the file allocation table that are for the extended address space are marked as unavailable;
- detecting connection of the add-on memory to the storage device;
- in response to detecting connection of the add-on memory to the storage device, configuring the storage device to use the add-on memory including changing the marking to available of the entries for the extended address space for locations in the add-on memory; and
- performing data transfer operations between a host connected to the storage device and the add-on memory via the storage device.

22. The method of claim 21, wherein:
the performing data transfer operations includes translating memory addresses between physical addresses for the add-on memory and logical addresses for the host.

23. The method of claim 21, wherein:
the add-on memory is connected to the storage device and the storage device is configured to use the add-on memory without erasing existing content previously stored in the storage device and without re-formatting the storage device.

24. The method of claim 21, wherein:
the add-on memory is connected to the storage device and the storage device is configured to use the add-on memory without recreating the file allocation table.

25. The method of claim 21, wherein:
after connection of the add-on memory to the storage device, an address space of the storage device and an address space of the add-on memory are addressed as one integral address space transparently to the host device.

* * * * *